United States Patent [19]
Paige

[11] 3,989,467
[45] Nov. 2, 1976

[54] APPARATUS FOR CONTACTING IMMISCIBLE FLUIDS

[75] Inventor: Peter M. Paige, Placentia, Calif.

[73] Assignee: Holmes & Narver, Inc., Anaheim, Calif.

[22] Filed: May 24, 1974

[21] Appl. No.: 472,956

[52] U.S. Cl. .................. 23/267 MS; 23/270.5 R; 196/14.52; 210/219
[51] Int. Cl.² .......................................... B01D 11/04
[58] Field of Search ............... 23/267 MS, 270.5 R; 196/14.52; 210/21, 23, 83, 84, 199, 201, 205, 207, 208, 219, 220, 221, 252, 255, 258, 319, 320, 511, 519, 520, 521, 522, 523, 524, 532, 538; 259/8, 24, 44

[56] References Cited
UNITED STATES PATENTS

| | | | |
|---|---|---|---|
| 2,081,852 | 5/1937 | Darby et al. | 210/205 |
| 2,405,158 | 8/1946 | Mensing | 210/84 |
| 3,239,315 | 3/1966 | De Smet | 23/267 MS |
| 3,489,526 | 1/1970 | El-Roy et al. | 23/267 MS |
| 3,544,079 | 12/1970 | Dressler | 23/267 MS |

Primary Examiner—Charles N. Hart
Assistant Examiner—Ivars Cintins
Attorney, Agent, or Firm—Christie, Parker & Hale

[57] ABSTRACT

Two liquids of different density and which are mutually insoluble are temporarily contacted with each other by flowing them countercurrently through a series of contactor units which each includes a mixing sump, a retention channel, and a settling tank. The two liquids are mixed with a pumping type impeller in a mixing sump connected by a retention channel to a settling tank where the mixed liquids separate into upper and lower layers, which are separately removed and fed to the respective sumps of the next succeeding units. The retention channel is relatively long and narrow to provide the required interaction time between the two liquids in the mixture, and still prevent any substantial separation of the two liquids within the channel. The retention channel is also relatively shallow so the sump, channel, and settling tank bottoms are at substantially the same level. The settling tank, which has a much larger area than the sump and channel combined, can be at a low-cost ground level location, with little or no excavation being required for the sump or channel. There is relatively little difference in elevation between the sump inlet and settling tank outlet to minimize the pumping head required of the impeller, thereby avoiding overmixing of the two liquids and incomplete separation in the settling tank.

13 Claims, 5 Drawing Figures

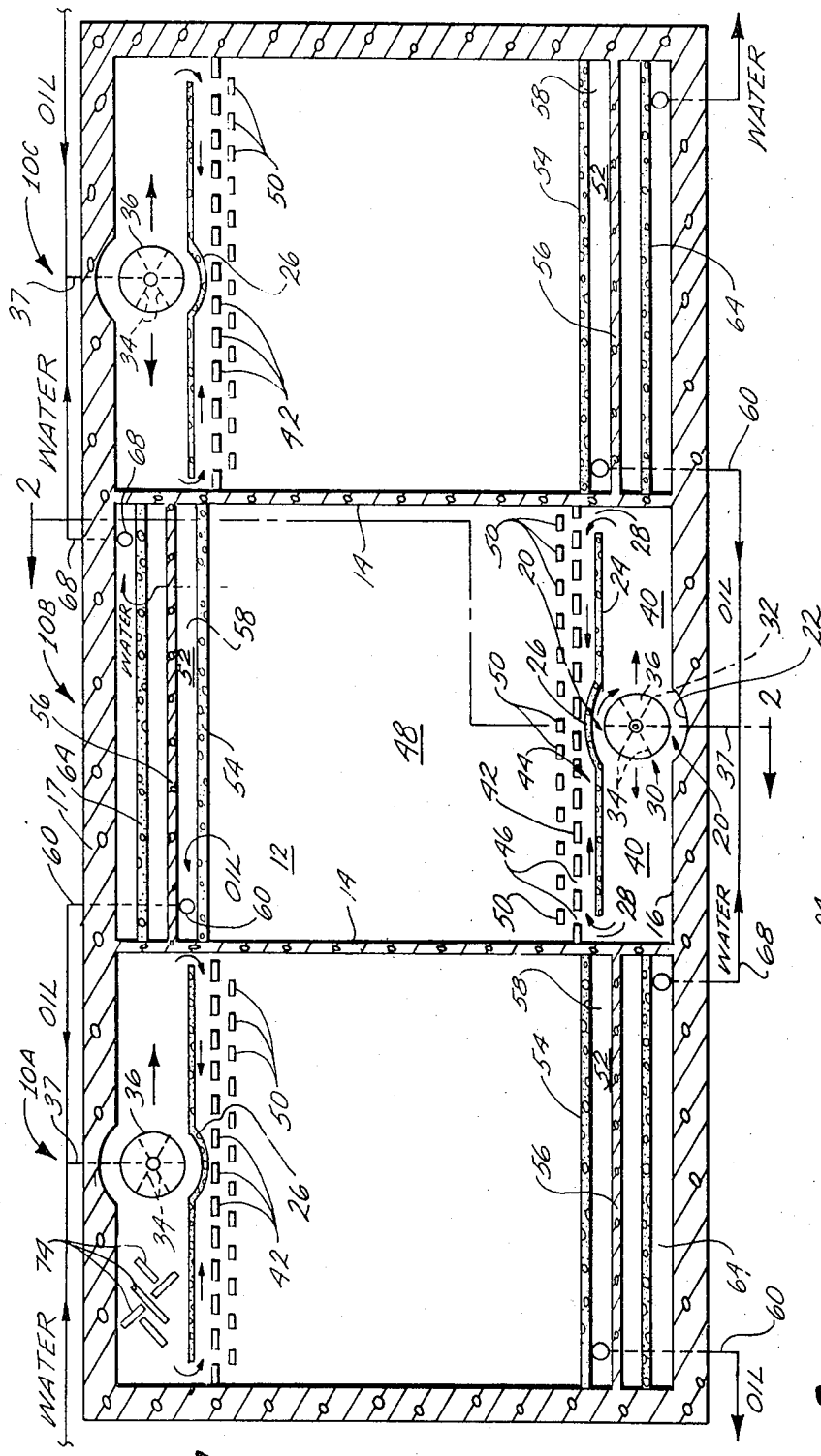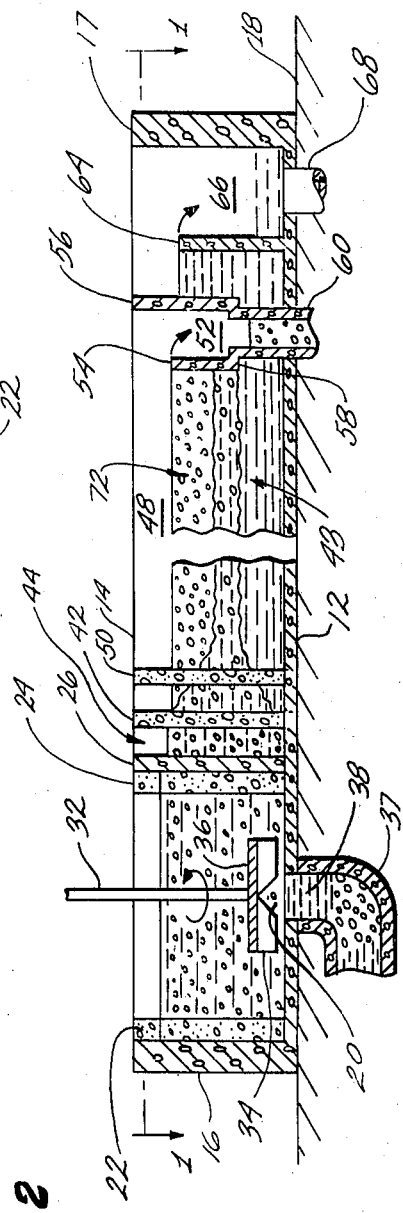

APPARATUS FOR CONTACTING IMMISCIBLE FLUIDS

BACKGROUND OF THE INVENTION

1. Field of the Invention

This invention relates primarily to equipment used for effecting temporary direct contact of two liquids which are substantially mutually insoluble.

2. Description of the Prior Art

Mutually insoluble liquids are usually brought into direct contact with each other for any of three principal purposes, namely, transfer of dissolved material or heat from one liquid to the other, or to cause a chemical reaction between the two liquids. The most important of these purposes, and the one with which this invention is primarily concerned, is solvent extraction, i.e., the separation of solution components by causing their unequal distribution between two mutually insoluble liquids. As used herein, the phrase "mutually insoluble liquids" means two liquids of such limited solubility in each other that for practical purposes they are considered mutually insoluble. Water and oil are examples of two such liquids.

Solvent extraction processes, particularly in the mining industry, typically use multiple stages of mixer-settler units, with an aqueous phase and a water-insoluble organic phase, such as, kerosene, being repeatedly mixed and separated, the two phases flowing countercurrently between stages of mixing tanks and settling tanks. One common version provides mixing and the pressure differential required for flow with a simple centrifugal pump impeller which mixes the aqueous and organic phases together as they enter a mixing tank, and pumps the mixture into a settling tank where the two phases separate and are separately recovered.

Considerable work in both the chemical and mining industries has led to the generally accepted view that maximum uniformity of mixing is achieved when the depth and diameter of the mixing tank are approximately equal. Accordingly, it has been the practice of the prior art to use tanks of roughly equal depth and diameter for mixing. A typical mixing tank used in extracting copper from a copper-bearing ore is 12 feet in diameter and 12 feet high. Aqueous and organic phases enter at the bottom of such a mixing tank, and are mixed and pumped into a settling tank, which has to be at or near the elevation of discharge from the mixing tank for maximum pumping efficiency and to avoid excessive pumping action which would produce an unacceptable over-emulsification of the aqueous and organic phases. A typical settling tank is in the shape of a flat horizontal pan about 50 feet long, 50 feet wide, and about 2 feet deep. Therefore, the bottom of the settling tank is about 10 feet above the bottom of the mixing tank. The liquid in the settling tank imposes a load of about 100 lbs. per sq. ft., resulting in a total load of about 250,000 lbs. on a typical settling tank, which must be supported about 10 feet in the air.

Thus, conventional mixing tank proportions applied to the design of mixer-settler units for solvent extraction require that the settling tanks be substantially above ground level, and the required elevation increases with increasing flow rates through the mixer-settler units. Such construction is expensive because of the cost of erecting elevated supports and providing necessary stiffening for the settling tank bottom.

Another disadvantage of the settling tank supported in the air is that it is subject to damage due to earthquakes and uneven ground settling, which can produce destructive tipping moments.

SUMMARY OF THE INVENTION

This invention provides a mixer-settler unit for contacting two mutually insoluble liquids of different density in which the settling tank can be located at ground level with a reduction, instead of an increase, of the pumping power required to move the two liquids through the unit. Even more important, the cost of constructing the settling tank is greatly reduced because it can be cast in concrete directly on the ground.

In the presently preferred embodiment, the two liquids are mixed in a shallow mixing sump and pumped through a relatively long, narrow, and shallow retention channel, which provides the required retention time, without substantial separation of the two liquids, for the desired reaction to take place between the two liquids. The mixture flows from the retention channel into a settling tank where the two liquids separate and are separately removed. Preferably, a pumping type centrifugal impeller is provided for mixing the two fluids in the sump and pumping them through the channel. The pumping type impeller provides the pressure differential required to force the fluid mixture to flow from the sump through the channel and into the settling tank. The pumping type impeller uses a simple centrifugal pump impeller mounted to rotate about a vertical shaft. The impeller is closed on its top face and located adjacent the bottom of the mixing tank so that the bottom acts as a pump casing relative to the bottom face of the impeller. Preferably, the aqueous and organic phases are admitted into the mixing tank at its bottom directly under the axis of rotation of the impeller. The two incoming phases are simultaneously mixed and pumped away from the mixing sump inlet.

Unlike paddle or turbine impellers freely rotating in a tank where the liquids may pass through the impellers several times, all of the liquid flow in the mixing sump passes only once though the pumping type impeller. Other than residual velocity through the retention channel, the only further agitation to which the mixture is subjected is the small frictional effect of the smooth upper face of the impeller and the surface of the drive shaft. Thus, essentially all mixing takes place within the one or two seconds that the two liquids spend travelling through the pumping type impeller, and the remaining volume of the sump and retention channel provides only a residence time for the mixture to permit the two phases to interact.

The retention channel is designed so that the mixed liquids flow through it in a way which does not permit any substantial separation of the two phases before they pass to the settling tank. This second criterion (non-separation in the retention channel) is more precisely defined by considering separation technology as applied to settler design. For any given two-phase system at a given temperature, a given settler horizontal surface area per unit of flow rate produces a given thickness of dispersion band (a layer of uncoalesced mixture of two mutually insoluble phases) at the interface. An increased flow rate (equivalent to decreased horizontal area) increases the depth of the dispersion band. Further increase of flow eventually spreads the band to the full settler depth, resulting in "flooding". This is equivalent to no separation taking place, which is the criterion for the retention channel in the mixer-settler of this invention. Accordingly, the total horizontal surface of the mixing sump and retention channel is a suitable fraction of the required settler horizontal surface. Ordinarily, the total horizontal surface of the mixing tank and retention channel is between about one-third and about one-tenth that of the settling tank for most mixer-settler systems. The optimum value depends on the nature of the phases and operating conditions. Where necessary, additional mixing or stirring means are included in the retention channel to insure adequate turbulence to prevent premature separation in the channel.

Ideally, the mixer-settler unit of this invention includes a relatively shallow mixing sump and one or more horizontal relatively long and narrow retention channels of the same depth as the sump. Preferably, the retention channel or channels extend along one edge of the settler in a direction transverse to the flow of the liquids through the settler. The total retention volume is the sum of the volume of the mixing sump and the channel. By properly matching the total horizontal areas of the relatively shallow mixing sump and horizontal channels with the required settler horizontal surface, the bottom of the sump, retention channel, and the settling tank can be located at substantially the same level, which permits the settling tank to be cast with its bottom as a concrete slab resting on the ground. This eliminates the need for expensive supports for holding the settling tank in an elevated location as required with the prior art design, and also eliminates the need for stiffening the settling tank bottom. As explained more fully below, it also reduces operating costs by reducing mixer speed (horsepower), and reducing the amount of organic phase lost due to over-emulsification which results from excessive mixer speed.

BRIEF DESCRIPTION OF THE DRAWINGS

FIG. 1 is a partially schematic plan view taken on line 1—1 of FIG. 2 of three mixer-settler units made in accordance with the preferred embodiment of this invention and connected in series to provide countercurrent flow of aqueous and organic phases;

FIG. 2 is a view taken on line 2—2 of FIG. 1;

DESCRIPTION OF THE PREFERRED EMBODIMENTS

Figure 3:
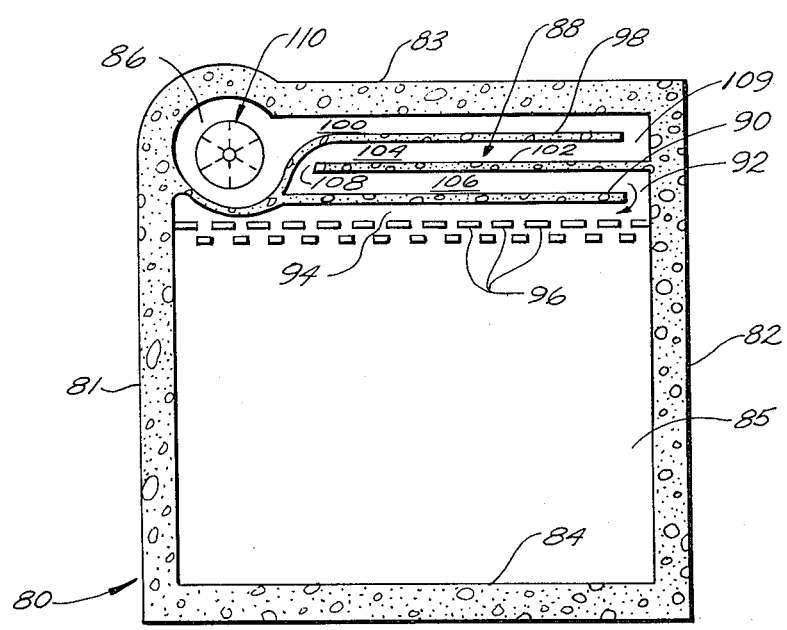
FIG. 3 is a fragmentary plan view of an alternate embodiment of the mixer-settler unit of this invention.

Referring to FIG. 1, first, second and third rectangular mixer-settler units 10A, 10B, 10C, respectively from left to right, are disposed side-by-side, and are connected in series for countercurrent flow of oil and water through them. The units are identical, and for brevity only the middle unit of the three is described in detail.

The mixer-settler unit includes a horizontal rectangular bottom 12, side walls 14, and inlet and outlet end walls 16 and 17, respectively. As shown in FIGS. 1 and 2, the bottom and side walls of the tank are cast integrally of concrete, and the bottom of the unit rests directly on the ground 18. A sump 20 is formed adjacent the inlet end wall 16 near its midpoint where the wall has a curved portion 22, which is convex facing the opposite end wall 17. A vertical baffle 24 has its lower edge formed integrally with the tank bottom, and is spaced from and parallel to the inlet end wall 16. The central portion of the baffle 24 has a curved section 26 opposing curved section 22 of the end wall 16. Section 26 is curved concave toward the curved section 22 to complete the sump 20. Each end of the baffle 24 terminates short of its respective adjacent side wall 14 to leave a respective exit opening 28 between the end of the baffle and the adjacent side wall.

A simple centrifugal pump impeller 30 is mounted in the central portion of the sump over an inlet opening 32 (FIG. 2) in the bottom of the sump. The impeller is mounted on the lower end of a vertical shaft 32, which is turned by a suitable conventional means (not shown). The impeller is spaced slightly above the bottom of the tank, and includes downwardly and radially extending blades 34 welded to the underside of a horizontal disk 36 secured to the shaft. Thus, the disk of the impeller and the bottom of the tank act as a pump casing for the blades. As the impeller is rotated, oil and water are drawn up through a supply line 37 connected to an inlet 38 in the bottom of the sump, mixed, and pumped outwardly from the sump into oppositely extending retention channels 40 formed between the inlet end wall 16 and the baffle 24. Mixed oil and water in the retention channels flow away from the impeller and out the openings 28 at each end of the baffle, and is uniformly distributed across the tank by an elongated vertical distributor wall 42 parallel to and spaced slightly from the baffle so that a distributor channel 44 is formed between the baffle 24 and the distributor wall 42. Vertical slots 46 are formed at equally spaced intervals along the length of the distributor wall and extend from the top to the bottom of the wall so that mixed oil and water from the distributor channel flows out through the slots and into a settling tank 48. To improve uniformity of distribution of mixed liquids flowing into the settling section of the tank, a separate vertical impingement picket 50 is disposed downstream of each vertical slot 46 in the distributor wall. Thus, liquid flowing through the slots 46 impinges on the pickets 50 to provide more uniform distribution along the inlet end of the tank. As shown best in FIG. 2, the height of the side walls, end walls, baffle, distributor wall and upper end of the impingement pickets are all substantially the same and the bottom of the sump, retention channel, and settling tank are all at substantially the same level.

A vertical, transverse oil phase launder 52 is formed between a first transverse vertical underflow and overflow weir wall 54 extending across the settling section from one side wall to the other, and a transverse underflow barrier wall 56 extending across the tank from one side wall to the other adjacent the discharge end wall 17. A bottom 58 in the oil phase launder extends from the lower edge of the weir wall to the lower edge of the barrier wall, and is spaced above the bottom of the tank so that the aqueous or heavier phase can flow under the oil phase launder. Oil flows over the top edge of the weir wall 54 and into the launder 52. An oil phase downcomer pipe 60 at the end of the oil phase launder adjacent the first mixer-settler unit removes the oil phase from the settling tank for flow to the sump of the first mixer-settler unit.

Water in the aqueous phase flows under the launder 52 and over a water weir wall 64 which extends from the bottom of the unit up to just below the operating level of the liquid in the settling tank, and from side wall to side wall of the unit. Thus, an aqueous phase launder 66 is formed between the water weir wall 64 and the outlet end of wall 17 of the tank. A water downcomer pipe 68 at the end of the water launder 66 adjacent the third unit transfers water from the discharge end of the second settling tank to the sump of the third mixer-settler unit.

In operation, oil from a downcomer pipe 60 in the third mixer-settler, and water from a downcomer pipe 68 in the first mixer-settler enter the inlet 38 of the sump in the second mixer-settler. The impeller imparts a centrifugal pumping action and effects a relatively gentle mixing of the oil and water to form an unstable or temporary emulsion of oil in water, or vice versa, depending on the system being treated and the manner in which the equipment is operated.

The unstable emulsion of oil and water flows from the sump, through the retention channel, and into the distributor channel. The flow rate of the mixed liquids, and the horizontal area of the sump and retention channels are such that "flooding" takes place, i.e., there is no substantial separation of the emulsion in sump or retention channel.

The mixed liquids flow from the distribution channel through the vertical slots in the distributor wall, impinge the pickets, and then flow across the settling section where under the force of gravity and the interfacial tension between the two phases, the dispersion is continuously settled and coalesced to form an upper layer 72 of the oil or lighter liquid, and a lower layer 73 of the aqueous or heavier phase.

The oil and water from the second mixer-settler are delivered to the first and third sumps, respectively, as previously described for the second sump.

The advantages of the invention are best appreciated by a numerical example. In a typical mixer-settler unit in which copper metal is recovered from an ore-bearing copper oxide, the total liquid flow rate is 5,000 gals. per minute, and the required residence (contact) time between the mixed oil and water is 2 minutes. The required settling tank horizontal area is 0.5 sq. ft. for each gallon per minute. For reasons of settler technology, the maximum length of the settler is 50 feet.

In conventional prior art mixing tank design, the mixing tank was 12 feet in diameter and 12 feet high for a total volume of 1,336 cu. ft., which provided a retention time of 2 minutes for the 5,000 gallons of liquid. The depth of the settling tank was 2 feet. Accordingly, the bottom of the settling tank was 10 feet above the bottom of the 12 foot high mixing tank because the inlet of the settling tank has to be at the level of the mixing tank outlet for minimum pumping head to avoid wasting power and overmixing the oil and water.

The mixing tank cannot be buried in the ground to permit the settling tak to be located at ground level because of the expense of excavating a hole to accommodate a tank 12 feet in diameter and 12 feet high, and because of the added plumbing costs, and because of the difficulty of locating and repairing leaks should they occur. Accordingly, the conventional settling tank was located about 10 feet above ground to minimize the pumping head required to be produced by the impeller, and thereby to minimize overemulsification of the oil and water phases.

To design a mixer-settler unit in accordance with this invention to handle 5,000 gallons of liquid per minute, the mixing sump is 12 feet in diameter, and the settling tank area is 0.5 sq. ft. for each gallon per minute, or $5,000 \times 0.5 = 2,500$ sq. ft.

The settler width is $$\frac{2,500 \text{ sq. ft.}}{50 \text{ ft(length)}},$$

or 50 ft. The length of the retention channel is 50 ft. minus 12 ft., or 38 ft.

The maximum allowable retention tank surface area depends on the liquids being used, the process involved, and operating conditions. Ordinarily, if the horizontal surface area of the sump and retention channel is between one-third and one-tenth that of the settling section area, premature separation of the oil and water phases will not occur. Assuming that the horizontal area of the sump and retention channel should be one-sixth of the area of the settling tank for the problem under consideration, the allowable area is 2,500/6 sq. ft., or 416 sq. ft. The allowable retention channel area is therefore 416 sq. ft. minus $\pi/4 \times 12^2$ sq. ft., or 303 sq. ft. The width of the retention channel is therefore 303/38 sq. ft. or 8 ft. The depth of the mixing sump and retention channel is $$\frac{1,336 \text{ ft.}^3}{416 \text{ ft.}^2},$$

or 3.2 ft.

If the settler is 2 ft. deep, then the settler bottom elevation is 3.2 ft.–2 ft., or only 1.2 ft. above the bottom of the retention tank. This difference is easily compensated for by fill under the settler, or slight excavation for the mixer sump and channel. Alternatively, the difference is completely eliminated if the maximum allowable surface area in the mixer-retention section is one-fourth to one-third the settler area, which normally is the case for most unit operations.

Thus, the sump, retention channel and the settling tank can be at ground level, eliminating the need for elevated supports and the stiffening of the bottom of the settling tank.

Another advantage of this invention is that the difference in height of the oil phase and water phase in their respective downcomer pipes is substantially reduced when the settling tank is at the same elevation as the mixing sump and retention channel. In the prior art configuration where the bottom of the settling section was some 10 feet above the bottom of the mixing section, the level of the water in its downcomer pipe was 2 or 3 feet below that of the oil in its downcomer pipe. This sometimes resulted in airlocks forming in the water pipe, and interfered with proper operation of equipment. Special precautions were required to prevent the occurrence of an airlock. With the arrangement of this invention, the difference in oil and water levels in their respective downcomer pipes is reduced to a few inches, thus making it possible to operate with the level of the water at that of the water launder so that no airlock occurs. In the prior art system, it was not always possible to carry the water level that high. Accordingly, the water level often was at some point down in the downcomer pipe where an airlock could more easily occur.

Another advantage of this invention is the reduced pumping head required of the pumping mixer. Such head is largely the difference in the static head of the inlet to the impeller and the outlet. For an organic phase specific gravity of 0.8, and a mixture specific gravity of 0.9, the reduction in required pumping head is the reduction in elevation multiplied by the difference in discharge and suction specific gravity. In a typical installation this amounts to a reduction of one-third to one-half the total pumping head required for the conventional prior art mix tank design, and therefore the horsepower is reduced to the same proportion. Even more important, this reduction is accompanied by a corresponding reduction of about 20% in required impeller speed. As indicated previously, high impeller speed is a source of solvent entrainment loss because of overemulsification. A reduction in speed reduces this loss.

In those operations where partial separation in the retention channel may occur at lower than normal flow rates, turn-over mixing vanes 74 (shown schematically only in FIG. 1 in the retention channel of the first unit) are installed in the channel at relatively low cost. Such vanes are well known. One vane particularly suitable is that shown in U.S. Pat. No. 3,652,061.

FIG. 3 is a plan view of an alternate embodiment of the mixer-settler unit of this invention in which a unit 80 includes vertical side walls 81, 82, inlet end wall 83, discharge end wall 84, and bottom 85. A mixing sump 86 is at one end of a retention channel 88 formed between inlet end wall 83 and a baffle 90 which extends from the sump to terminate short of side wall 82, leaving an opening 92 into a distributor channel 94 formed between baffle 90 and a parallel distributor wall 96 identical with the distributor wall previously described in FIGS. 1 and 2.

The channel 88 is divided into a plurality of narrow passages. A first divider wall 98 extends from the sump outlet 99 to terminate short of side wall 82. The divider wall 98 is adjacent inlet end wall 83 to form a first passage 100 between the two walls. A second divider wall 102 extends from the side wall 82 into the space between the first divider wall 98 and baffle 90 to form a second passage 104 and a third passage 106. The second divider wall terminates short of the sump to leave an opening 108 through which the second and third passages communicate. The first and second passages communicate through an opening 109 at the end of the first divider wall. Thus, the mixture of oil and water pumped from the sump by an impeller 110 travels a serpentine path through the passages before entering the settling tank. The location of the sump at one end of the retention channel, and the division of the retention channel into a plurality of passages, increases the velocity of the mixture flowing through the channel, thereby preventing any premature separation.

The discharge end of the unit is identical with that previously described for the units shown in FIGS. 1 and 2, so its description is not repeated here for the sake of brevity.

Figure 4:
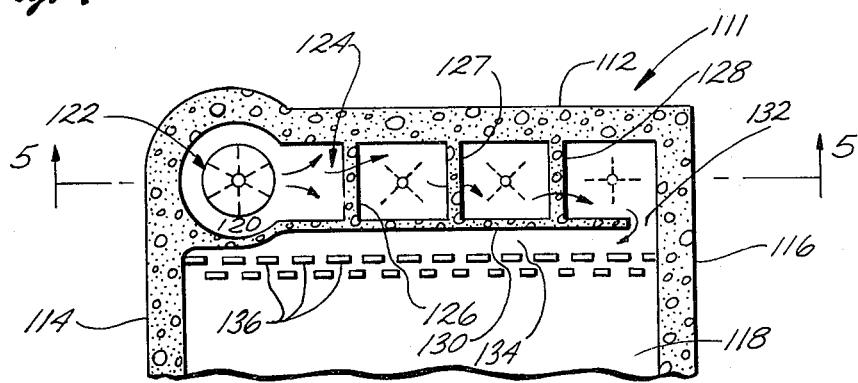
FIG. 4 is a fragmentary plan view of another embodiment of the invention.
Figure 5:
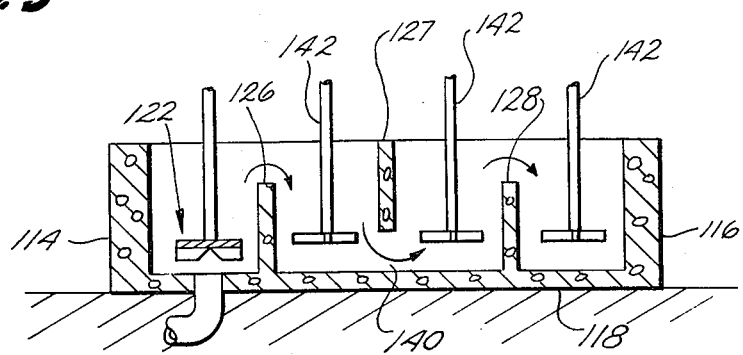
FIG. 5 is a view taken on line 5—5 of FIG. 4.

Referring to FIGS. 4 and 5, a mixer-settler unit 111 includes an inlet end wall 112, a first side wall 114, a second side wall 116, and a bottom wall 118. The outlet end of the unit is not shown because it is identical with that shown in FIGS. 1 and 2.

A sump 120 in the corner formed by the intersection of the inlet wall and first side wall contains an impeller 122 which mixes and pumps incoming water and oil through a retention channel 124 divided by transverse first, second, and third baffles 126, 127, and 128. The first baffle extends from the bottom of the unit up to a height just below the operating level of a mixture pumped through the retention channel so that the mixture is forced to flow over the baffle, which extends from inlet end wall 112 to a divider wall 130, which is parallel to the inlet wall and extends from the bottom of the unit up above the operating level of the liquid. The divider wall 130 also extends from the first side wall 114 to a point just short of the second side wall 116, leaving an opening 132 through which liquid can flow into a distribution channel 134 formed between divider wall 130 and the distributor wall 136 spaced from the divider wall. The distributor wall is identical with that previously described in FIGS. 1, 2 and 3, so its description is not repeated here.

The second baffle 127 extends from the inlet wall 112 across the channel to divider wall 130, but is spaced from the bottom of the unit to leave an opening 140 so that mixed liquid can pass under it. The third baffle extends from the bottom of the unit up to just below the operating level of the liquid and from inlet end wall 112 to divider wall 130 so the mixed liquid is forced to flow over the wall. A separate mixing paddle 142 is disposed in each of the spaces between adjacent baffles and in the space between the third baffle and the second sidewall so that the mixture of oil and water in these spaces can be independently agitated with gentle stirring to maintain good mixing without overemulsification of the mixture.

With the arrangement shown in FIG. 4, the oil and water phases in the retention channel are kept in intimate contact by the application of mixing energy applied at spaced locations so that there is no intense application of energy at any one point. This avoids overemulsification of the mixture, which would result in loss of one of the two phases because of incomplete separation.

I claim:
1. Apparatus for contacting a first liquid with a second heavier liquid which is substantially insoluble in the first, the apparatus comprising a mixing sump having an inlet and an outlet, means for admitting the two liquids into the sump inlet, means for mixing the two liquids in the sump, an elongated substantially horizontal retention channel having an inlet and outlet, the channel inlet being connected to the sump outlet, the bottom of the sump and of the retention channel being at substantially the same level, the horizontal distance between the channel inlet and outlet being substantially greater than the depth of the channel, a settling tank with a substantially horizontal bottom at substantially the same level as the bottom of the retention channel, the settling tank having an inlet connected to the channel outlet, and outlet means for separately removing separated first and second liquid from the settling tank so that liquid flows through the settling tank from the inlet to the outlet, the sump, channel and settling tank having substantially the same depth.

2. Apparatus according to claim 1 in which the mixing means includes a pumping type impeller, and means for rotating the impeller to mix the two liquids and pump the mixture toward the sump outlet.

3. Apparatus according to claim 1 in which the length of the retention channel is at least twice the depth of the channel.

4. Apparatus according to claim 1 in which the length of the retention channel is at least twice the channel width.

5. Apparatus according to claim 1 in which the retention channel extends transversely to the direction of the flow of liquid through the settling tank.

6. Apparatus according to claim 1 in which there is a common side wall between the retention channel and the inlet end of the settling tank.

7. Apparatus according to claim 1 in which the horizontal dimension of the mixing sump in a direction transverse to a major portion of the flow path of liquid through the retention channel is substantially greater than the width of the retention channel.

8. Apparatus according to claim 1 in which the sump is located at one end of the channel.

9. Apparatus according to claim 1 in which the horizontal area of the retention channel is between about one-third to about one-tenth the horizontal area of the settling tank.

10. Apparatus according to claim 1 which includes mixing means in the channel spaced from the mixing means in the sump.

11. Apparatus according to claim 10 which includes a plurality of separate mixing means longitudinally spaced in the retention channel.

12. Apparatus according to claim 10 in which the mixing means includes a series of overflow and underflow baffles longitudinally spaced in the channel.

13. Apparatus according to claim 12 which includes mechanical mixers between adjacent baffles, and means for driving the mixers to maintain the two liquids in a mixed state.

* * * * *